United States Patent

[11] 3,587,227

[72] Inventors Maxwell H. Weingarten;
 Robert J. Weingarten, both of 4720
 North Cramer Street, Milwaukee, Wis.
[21] Appl. No. 830,082
[22] Filed June 3, 1969
[45] Patented June 28, 1971

[54] POWER GENERATING MEANS
 26 Claims, 4 Drawing Figs.
[52] U.S. Cl. ................................................ 60/1,
 60/23
[51] Int. Cl. ................................................ F03g 7/06
[50] Field of Search ................................ 103/1, 1
 (E), 1 (M); 317/231; 230/1; 60/1, 23; 417/321,
 48; 62/114, 141

[56] References Cited
 UNITED STATES PATENTS
3,143,691 8/1964 Hurd ............................ 317/231

3,427,978 2/1969 Hanneman et al. ............ 103/1

Primary Examiner—Robert M. Walker
Attorney—Morsell and Morsell

ABSTRACT: Utilizing the natural forces of osmosis inherent in nature a power generator is provided including a porous container having a surrounding internal and/or external semipermeable membrane and containing a solution of relatively high molecular concentration selective to said membrane, which container is mounted in a chamber into which a solvent is introduced, said solvent flowing by osmosis through said semipermeable membrane into said solution container, the resulting increased liquid volume in said container forcibly extending an associated piston to pressurably engage and compress the air or other fluid in an adjacent pressure cell to create pressure therein providing a source of potential power for any desired purposes.

INVENTORS
MAXWELL H. WEINGARTEN
ROBERT J. WEINGARTEN

BY

Morsell & Morsell
ATTORNEYS

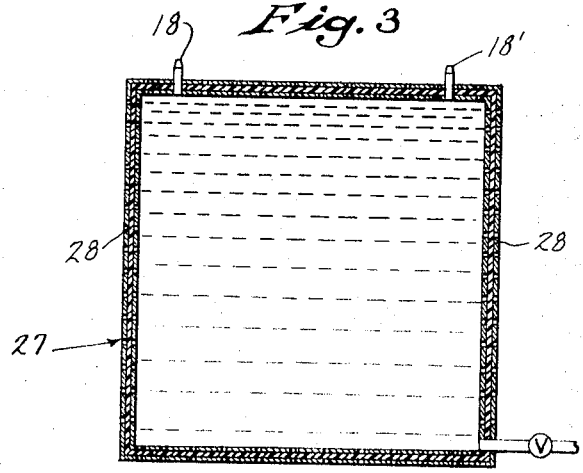
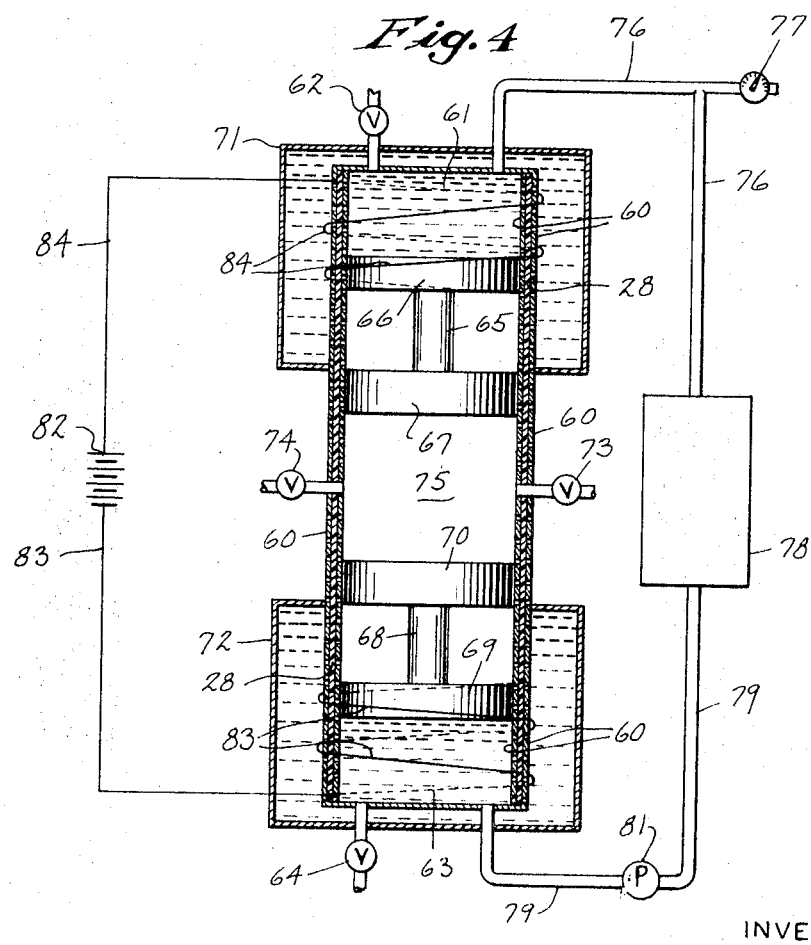

3,587,227

POWER GENERATING MEANS

BACKGROUND OF THE INVENTION

1. Field of the Invention

The present invention relates to the field of power production, and more particularly to a novel apparatus and system for utilizing the natural forces of osmosis for the production of commercially usable energy.

2. Description of the Prior Art

The conventional methods of producing the power requirements of our modern, highly industrialized civilization all require relatively large and expensive production facilities and equipment, which necessarily contributes substantially to the cost of said power to the consumer. Moreover, many of said conventional power production facilities require the combustion of coal, gasoline, or other fuel or products that emit noxious and even poisonous byproducts which pollute and contaminate the air, the soil, and even our water. Moreover, the world's supply of such conventional fuels for our ever increasing power requirements is rapidly being depleted, and there is a very real danger of a shortage of existing power-production sources in the not too distant future.

Heretofore, as far as applicants are aware, no one has ever contemplated the harnessing of the tremendous potential force of osmosis which is inherent in nature to provide a low cost and inexhaustible power supply for commercial purposes, and which novel power production system will not contaminate our air, soil, or water.

It has been attempted in a few instances in the past to utilize the principle of osmosis in the operation of certain mechanical applicances, as, for example in refrigerators in order to eliminate the necessity for a mechanical pump, but such prior attempts have not proven successful, and were ultimately abandoned. In addition, said earlier attempts to utilize the force of osmosis were very limited in their intended scope, and in no way anticipate the revolutionary concept of power generation comprising the present invention. Examples of said prior, unsuccessful attempts to utilize the natural phenomenon of osmosis for creating usable power are illustrated in U.S. Pat. No. 2,116,958 and U.S. Pat. No. 2,104,847.

SUMMARY OF THE INVENTION

The present invention provides a novel, compact apparatus wherein a porous container having a covering or lining membrane of semipermeable material is mounted in a surrounding solvent chamber and filled with a solution of relatively high molecular concentration. A solvent which is permeable relative to said membrane is then introduced into the surrounding solvent chamber. Due to the principle of osmosis said solvent flows with predetermined and controlable force through the membrane and into said solution container in order to equalize the molecular concentrations of said fluids, thereby increasing the volume of liquid in said solution container. In one preferred embodiment of the invention the expanding liquid volume in said solution container forcibly acts upon a piston mounted in and projecting from one end of said container and forces said piston outwardly to pressurably compact the air or other fluid in an adjacent pressure cell, thereby creating potential energy in said cell which can be released in the form of a fluid or pneumatic jet stream through a nozzle to drive a turbine or the like for the production of usable power, said novel osmopower unit being adapted to drive motors, generators, turbines and other mechanical devices as well as to generate electricity for the production of heat, sound, light, or other uses.

A further important object of the present invention is to provide a revolutionary new concept in the production of power, utilizing the natural phenomenon of osmosis as described, which eliminates combustion and the resulting noxious and toxic byproducts of combustion which characterize conventional power manufacturing systems, and which combustion byproducts are polluting and contaminating our air, soil, and water in an ever increasing and dangerous degree.

A further object of the invention is to provide a novel apparatus and system for harnessing the natural energy of osmosis and directing the same for power-producing purposes, as described, which system permits the production of unlimited power for a fraction of the cost of present day commercial power production methods.

Further objects of the invention are to provide an osmopower unit which is not only designed to act upon an associated piston to create usable energy in the form of fluid compression in an adjacent chamber, as described, but wherein a modified form of said osmopower unit can be utilized with plural coacting reciprocating pistons and electromagnetic solution-agitation means to provide a recycling action resulting in constant pressure production, wherein still other forms of said basic osmopower unit can be operated without the use of pistons, and wherein a simplified form of said osmopower unit can be installed in a lake or other body of water adapted to provide an unlimited supply of operating solvent.

Still further objects of the present invention are to provide novel apparatuses for harnessing and utilizing the natural force of osmosis, as described, which apparatuses are simple, efficient, and economical in operation, relatively inexpensive in design and construction, durable and long-lasting, simple to repair in the event of wear or damage, and which apparatuses are otherwise particularly well adapted for their intended purposes.

BRIEF DESCRIPTION OF THE DRAWINGS

In the accompanying drawings, wherein there is illustrated one preferred embodiment of the invention and several modified forms thereof, and wherein the same reference numerals designate the same or similar parts in all of the views:

FIG. 3 is a sectional view of another modified form of said osmopower unit; and

FIG. 4 is a sectional and diagrammatic view of still another modified form of the invention.

DESCRIPTION OF THE PREFERRED EMBODIMENTS

Figure 1:
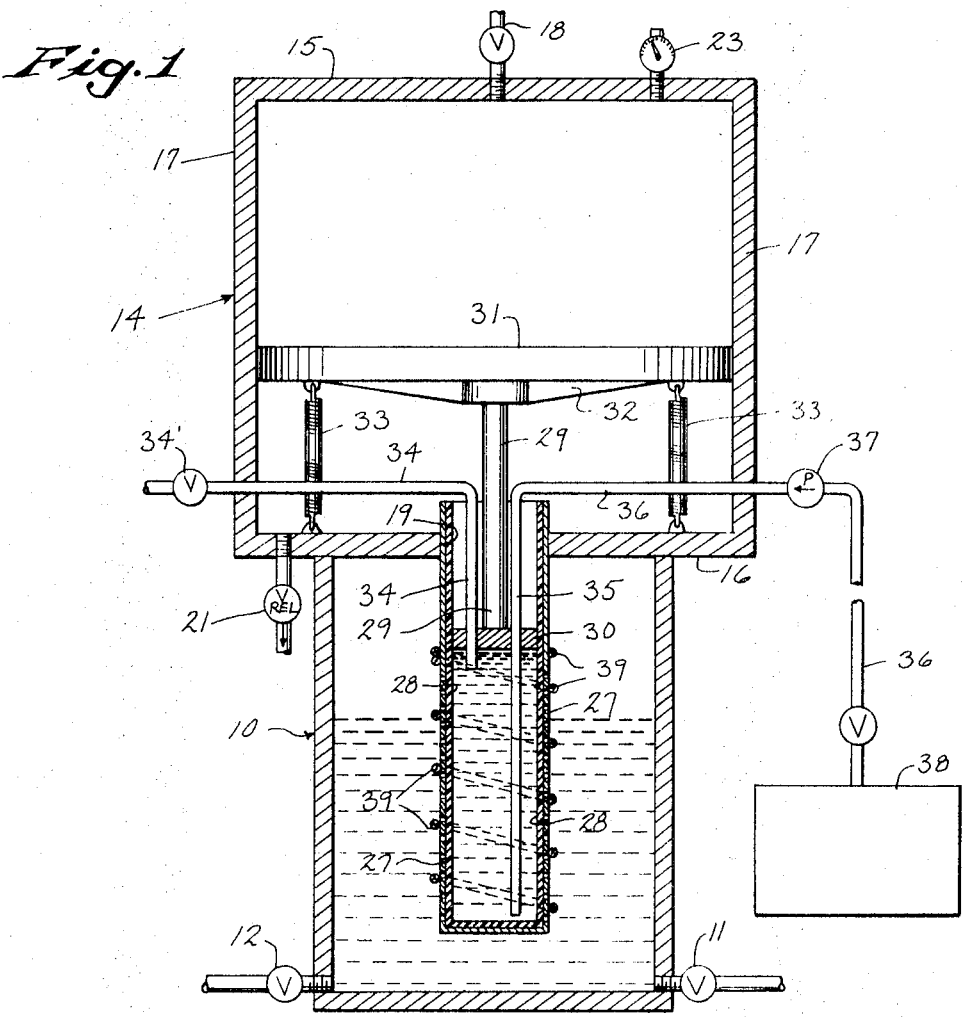
FIG. 1 is a vertical sectional view of an osmopower unit coming within the scope of the invention.

Referring now more particularly to FIG. 1 of the drawing, in the form of the present invention illustrated therein the numeral 10 designates a fluid container, hereinafter referred to as the solvent chamber, which may be cylindrical or any other desired shape, and which chamber includes a fluid inlet valve 11 and drainage valve 12 adjacent the bottom thereof.

Mounted on the top of or spaced above the solvent chamber 10 is an enlarged container 14, hereinafter called the pressure cell, which is preferably, although not necessarily, cylindrical in shape. Said pressure cell 14 includes a top wall 15, bottom 16, and sidewall 17. The bottom wall 17 of said cell is provided with a central opening 19, and also provided in the lower portion of said pressure cell is a relief valve 21. A pressure jet or nozzle 18 is mounted in the top 15 of said cell, and also installed in said top wall is a pressure gauge and safety valve 23, the function of which members will be hereinafter described.

Mounted in the opening 19 in the bottom of the pressure cell 14 is an open top tubular container 27 which extends downwardly a substantial distance into the solvent chamber 10, said tubular member being of substantially smaller diameter than said surrounding chamber 10. SAid tubular container 27 is formed of a rigid material, and its surface is provided with a multiplicity of openings or pores to permit fluids to readily pass therethrough.

In accordance with the present invention, a membrane lining 28 of a semipermeable material is secured within or around the peripheral surface of said tubular container 27 (or a two-ply container could be used with the membrane sandwiched therebetween). Said membrane may be formed of cellulose acetate for excellent results, but it is to be understood that other comparable organic or synthetic substances having the required semipermeable characteristics hereinafter described could also be utilized, and the invention is not to be limited in this important respect. A host of selective semipermeable membranes of varying functions are possible.

With respect to said membrane lining 28, incidentally, it may be applied in relatively flat form on and surrounding either the interior or exterior surface of said porous tubular container 27, as illustrated, or said membrane may be convoluted or corrugated if desired in order to provide an increased surface area through which a greater volume of water or other solvent can pass, as will be described, depending upon the requirements of the particular installation.

Movably carried coaxially within and projecting from the top of the tube 27 is a telescopic piston rod 29 having a disc 30 on the lower end thereof which is in axially-slidable, leakproof engagement with the inner wall of said tubular container. The upper end of said piston rod 29 is provided with an enlarged piston head 31 which is in axially slidable, sealing engagement with the sidewall of the pressure cell 14, there being suitable gussets 32 or the like on the underside thereof reinforcing said piston head. Also secured to the underside of said piston head 31 are spring means 33 extending between said piston head and the bottom 16 of said pressure cell.

Projecting through the disc 30 on the lower end of the piston rod is an inlet pipe 34 having an associated valve 34' for introducing a solution into the tubular container 27, as will be described, and also extending downwardly through said disc is an elongated pipe 35. The upper, projecting end of said pipe 35 is connected by a line or conduit 36 to a pump 37 which, in turn, is connected to a solution reservoir 38.

In some installations it may be desirable to include a heating coil 39 in surrounding relationship to the tubular container 27, the purpose of which will be described, although this is not a critical feature and the invention is not to be limited or confined in this respect.

In the use and operation of the novel osmotic power generator, or so-called osmopower unit, illustrated in FIG. 1, the piston 29 is initially in its lowered position, due to the tension of the springs 33, or other equivalent means and a fuel in the form of a concentrated solution is introduced through the inlet line 34 into the container 27. An electrolyte solution of relatively high molecular concentration such as $NaCl$, $KM_nO_2$, $CaCl_2$, $NAHCO_3$, $KHPO_4$, $KHCO_3$, and others may be utilized with good results, although it is also possible to employ a less expensive and readily available nonelectrolyte solution such as water and sugar, or urea.

After the container 27 has been substantially filled with the selected concentration of a solute in a solvent, as described, water or some other solvent of lesser molecular density, and which is permeable relative to the membrane 28, is introduced into the surrounding chamber 10 through the inlet valve 11.

Since nature will not allow a difference in molecular concentration in associated solutions, if a solution of relatively high molecular concentration is separated from a solvent (or less concentrated solution) by a semipermeable membrane the solvent will flow by osmosis into the solution through the membrane. This is the well-known principle of osmosis. Consequently, in the illustrated apparatus the water or other solvent in the chamber 10 immediately commences passing through the semipermeable lining 28 of the solution container 27 to dilute the denser solution therein.

Since the solution in the container 27 cannot pass outwardly through the semipermeable membrane 28 the volume of liquid in said tubular container is thus progressively increased. The result is that said increasing liquid volume pushes upwardly on the disc 30 on the lower end of the piston rod 29 and forces said piston rod upwardly.

In accordance with the principle of osmosis the solvent will flow into the solution until the pressure of the solution is high enough to prevent it, which is referred to as the osmotic pressure of the solution. The pressure of a 60 percent solution of one of the electrolyte solutions of relatively high molecular concentration may approach 40,000 lbs. per square inch, while the osmotic pressure of a nonelectrolyte solution such as sugar and water may be on the order of 3,000 lbs. per square inch. Thus if the electrolyte solution is separated from pure water or other solvent by a semipermeable membrane a pressure of approximately 40,000 lbs. per square inch would have to be applied to the solution to prevent the solvent from flowing into said solution, while a pressure of 3,000 lbs. per square inch would be required to prevent the solvent from flowing into a comparable concentration of sugar and water. Obviously, the pressures thus created with either an electrolyte or nonelectrolyte solution are great, and the upward pushing force on the piston is substantial.

The rate of flow of the solvent into the solution can be accurately predetermined and set by regulating the initial concentration of the solution in the container 27, as well as controlling the surface area of the membrane 28, and can be varied depending upon the requirements of the particular power-generating unit.

As the piston rod 29 is elevated during the operation of the present invention the piston head 31 moves upwardly in the pressure cell 14, of course, and since said piston head is in sealing engagement with the sidewalls of said cell the air or other fluid therein is forcibly compacted in the upper portion of said cell, thereby creating potential energy. In this respect, incidentally, it is to be understood that the term "fluid" as used herein includes either liquid or gaseous substances, and said pressure cell can contain air, water, oil, or any other compressant or noncompressant, and the invention is not to be limited in this respect. In addition the pressure cell 14 may be constructed of either rigid or elastic materials.

In the illustrated form of the invention the piston rod 29 is preferably telescopic, as mentioned, so that continued osmotic action after the desired pressure level within the cell has been attained will merely telescope said piston rod and eliminate the possibility of dangerous pressure buildup. It is to be understood, however, that numerous other comparable means for ensuring safety could also be utilized.

The air or fluid pressure created in the upper portion of the pressure cell 14 is visually indicated by the gauge 23. Said energy can be released at a predetermined rate and force through the nozzle valve or jet 18 at the top of said cell, it being possible to utilize valves of any desired diameter to produce either a high or low pressure jet stream, and said fluid pressure can be employed as a source of power for a multiplicity of purposes. It is contemplated, for example, that the resulting jet stream can be used to turn a turbine for driving any desired type of mechanical apparatus, as well as for driving any type of generator for the production of electric power. In short, with the simple but novel osmogenerator hereinabove described it is possible to convert osmotic power to mechanical energy, thermal energy, electricity, magnetic or any other type of energy or power.

When the desired pressure buildup has been attained within the cell 14 the energy represented thereby can either be used immediately for a desired application, or it can be stored in said cell for future use, it being possible to utilize a plurality of similar cells or tanks for power storage purposes.

When the pressure in the cell 14 has been released, through the jet valve 18, the solution filling the tubular container 27 can be evacuated through the lines 35, 36, by means of the pump 37 driven by the osmogenerator and stored in the reservoir 38 for reuse in the next power-generating cycle. The water or other solvent remaining in the container 10 is simultaneously withdrawn through the drainage valve 12, and the piston is automatically returned to its initial, retracted position by the action of the springs 33 to ready the unit for the next power-generating cycle. During the descent of the piston the relief valve 21 in the lower portion of the pressure chamber is self-operating to reduce the pressure therein and facilitate the retraction of said piston. In the event the solution has become too diluted additional solute can be introduced into the container through the inlet 34. Ordinarily, however, solute need be added only infrequently since the osmogenerator will continue to function so long as the molecular concentration of the solution is greater than that of the solvent in the chamber 10.

Ideally, in the operation of the osmopower unit pressure will continue to build up in the cell 14 until it equalizes the osmotic pressure of the solution, at which point further flow of the water or other solvent from the chamber 14 into the container 27 will be prevented. Then, when pressure is subsequently released from said cell in the form of a jet stream from the nozzle 18 the resulting pressure reduction in said cell will cause solvent from said chamber 10 to again begin flowing into the tubular container 27 and to thereby build up the pressure in said cell until it again equalizes the osmotic pressure of the solution, and halts the inward flow of the solvent. Thus there can be provided a system whereby the pressure and power potential in the cell 14 is automatically constantly maintained at its optimum level.

The entire system comprising the present invention can be flushed and cleaned merely by draining the fluids therefrom, and in the preferred form of the invention different solutions and solvents can be interchangeably employed as fuel in the same unit. Another important feature is that the unit is rugged and durable in construction and any necessary repairs such as the replacement of the sealing discs or fluid chambers can be quickly and easily accomplished without any special skill or equipment.

As hereinabove described, in some instances it might be desirable to mount a heating coil 39 around the tubular member 27. The purpose of said heating coil is to provide sufficient heat to ensure the fluids do not freeze when the osmopower unit is used in an intemperate climate. It has been found, too, that in any climate the effectiveness of the osmogenerator may be directly affected by variations in temperature and for optimum operating efficiency automatically thermostatically controlled heating and cooling means can be provided. It is to be understood, too, that the operation of the osmogenerator may also be affected by variations in gravity, atmospheric pressure, and magnetic and electrical forces, as well as temperature, and all of these factors must be considered when designing and rating a unit for a particular installation.

Figure 2:
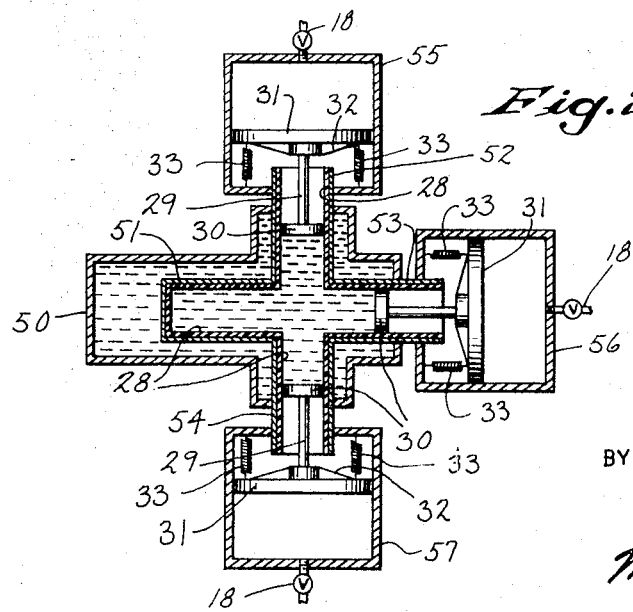
FIG. 2 is a diagrammatic plan view of a modified form of said unit.

As mentioned, for many applications a plurality of similar osmogenerators can be employed simultaneously to provide increased, continuous power production, and in this respect a number of suitable structural arrangements of various shapes, sizes, and configurations can be employed, such as the combination unit illustrated in FIG. 2.

In the modified embodiment of the invention which is shown in simplified diagrammatic sectional form in FIG. 2, the solvent chamber 50 has a tubular solution container 51 mounted therein, said tubular container having a semipermeable membrane lining 28 and including a plurality of radiating arms 52, 53, and 54, each of which has an axially-movable piston rod 29 projecting therefrom. Said arm extensions 52, 53, 54 communicate with pressure cells 55, 56, and 57, respectively, and carried on the outer ends of the axially-movable piston rods 29 are piston heads 31 which are in movable, leakproof engagement with the walls of said pressure cells. Thus when an electrolyte or other solution is introduced into the container 51 and the chamber 50 is filled with water or other solvent of lesser molecular concentration the latter immediately begins to flow through said semipermeable membrane 28 forming the lining or surrounding the exterior of the container 51 and the increased liquid volume in said tubular container simultaneously pushes outwardly on the plurality of pistons 29. As in the principal form of the invention, the piston heads 31 function to pressurably bear against the air or other fluid in the pressure cells 55—57, and the pressure buildup therein can be stored or released as desired through nozzles 18 to generate power for desired purposes.

It is to be understood, of course, that while a modified unit employing a single solvent chamber and three radiating pressure cells has been illustrated in FIG. 2, it is possible to employ any number of similarly associated pressure cells, as well as a plurality of solvent and solution containers of various designs, and the invention is by no means to be limited to the illustrated arrangements or combinations. It is contemplated, in fact, that in lieu of an osmopower unit employing a separate pressure cell with a movable piston extending into said cell from the solution container, it might be advantageous in some instances to merely have a restricted pressure area provided in the solution container itself. Moreover, in such a simplified form of osmopower unit the movable piston could be eliminated and the potential energy created in the pressure area merely by the compressing action of the increasing volume of solution on the fluid in said restricted pressure area.

Alternatively, within the scope of the present invention it is also possible to utilize a confined solution container of any desired shape and as the inwardly flowing solvent increases the volume of solution therein to the point where said container becomes filled and the solution is progressively compressed therein said pressurized solution can be discharged in the form of a controlled jet stream to drive a turbine or the like. Such a confined solution container 27 is illustrated in FIG. 3 of the drawings and could be installed in a lake, river, or other body of water forming an unlimited solvent supply, thereby providing continuous power production until such time as the solution ultimately becomes too diluted to function effectively. In such an application it would be important, of course, that the solute be a substance that would not pollute or contaminate the river or lake.

In the simplified embodiment of the invention shown in FIG. 3, the solution container 27 includes a pair of spaced porous walls and the semipermeable membrane 28 is sandwiched therebetween, although it is to be understood that such a modified container structure is illustrated merely by way of example of various structural variations that can be employed within the spirit and intended scope of the present invention and the invention is by no means to be limited or confined in this respect. In addition, a pair of jet nozzles 18 and 18' of different diameters are provided in the illustrated unit to permit the selection of a jet stream of desired size and force, depending upon the requirements of the particular unit.

In FIG. 4 of the drawings there is shown still another modified form of osmopower unit coming within the intended scope of the present invention, said unit being shown in section and simplified diagrammatic form. As illustrated therein, the unit includes an elongated cylindrical member or container 60 having an upper, solution-containing chamber 61 with an inlet and outlet valve 62, and a second solution-containing chamber 63 at the extreme opposite end thereof provided with an inlet and outlet valve 64, said chambers containing a suitable solution of high molecular concentration. Said cylindrical container includes a pair of porous walls and sandwiched therebetween is a semipermeable membrane 28. As in the other forms of the present invention hereinabove described, it is immaterial whether said membrane lining is mounted on the interior or exterior of said member 60, or sandwiched between two spaced porous walls in the manner illustrated in FIG. 4. Similarly, while references are made herein to the upper and lower portions of said container this is merely to coincide with the structure as pictured, and it is to be understood that the unit does not necessarily have to be mounted vertically.

Slidably mounted in the upper portion of the container 60 is a piston 65 including a disc 66 defining the upper, solution-containing portion of said member and having a piston head 67 normally positioned above the longitudinal midpoint of said container. A similar piston 68 is axially movably mounted in the lower portion of said container 60, said piston including a disc 69 defining the lower solution-containing chamber and a piston head 70 normally positioned below the container longitudinal midpoint. Intermediate the length of said container between said piston heads 67, 70, is a pressure cell area 75, and projecting therefrom are a pair of power jets 73, 74, having orifices of different diameters, which can be drivably connected to a turbine or the like, as will be described.

As is shown in the drawing, the upper portion of the solution container 60 is mounted within a surrounding chamber 71 containing water or some other suitable solvent, and the lower portion of said container 60 is similarly immersed in a solvent chamber 72.

The upper, solution-containing portion 61 of the container 60 has a conduit 76 extending outwardly therefrom, there being a pressure gauge 77 mounted therein, which conduit leads to an osmolarity regulator 78, and a similar conduit or line 79 connects said osmolarity regulator to the opposite solution-containing portion 63 of the container 60, there being a circulating pump 81 operatively mounted in said line. A source 82 of electric current is provided with a wire 83 which is wound in spiral form around the lower solution-containing portion 63 of the osmopower unit, and a similar current-carrying wire 84 is wound around the upper portion 61 of the unit.

In the use of the modified form of osmopower unit illustrated in FIG. 4, electric current is alternately directed to the desired solution-containing portion of the unit and functions to provide electromagnetic fields therein which create a turbulence, as well as regulating the temperature therein, and in conjunction with the osmolarity regulator 78 causes predetermined changes and recycling in the molecular concentration to provide a constant shifting molecular balance between the opposing osmogenerators. Thus there is provided a reciprocating movement of the opposed pistons 65, 68, to maintain a predetermined constant pressure within the pressure cell 75. The result is prolonged constant power, and, in addition, extremely accurate and delicate regulation of the power supply can be attained through precision control of the molecular concentrations in the opposing units. As mentioned, the accumulated pressure cell area 75 can be utilized as desired by means of the power jets 73, 74.

The critical feature of the modified, double-acting osmogenerator illustrated in FIG. 4, and hereinabove described, is that it is recognized that the operation of osmopower units coming within the scope of the present invention may be affected not only by temperature changes, but also by electrical and magnetic forces as well as by variations in the solutions, including the Hydrogen-ion concentration thereof, and that these factors can be advantageously utilized to provide a highly sophisticated and extremely accurately controllable power production unit.

As hereinabove mentioned, it is to be understood that what is intended to be covered herein is not only the illustrated embodiments of the present invention but also any and all modified forms thereof wherein chemical energy in the form of osmotic pressure is converted into kinetic and potential energy for the powering of hydraulic, electrical, hydrostatic, or mechanical devices and machines.

From the foregoing detailed description it will be seen that the present invention provides an entirely new and revolutionary concept in the production of power. Utilizing the osmotic force inherent in nature, applicants have provided a practical and workable means of harnessing and directing this force to useful purposes. With the osmopower unit comprising the present invention it is possible to obtain practically unlimited energy at minimal cost, and to utilize the resulting power for innumerable diverse purposes.

With the present invention, for example, a house could have its own compact osmogenerator to supply the power requirements for operating all of the household applicances and equipment, including the heating and air conditioning units, and at a fraction of the cost of present power sources. In addition, the invention could be used in lieu of conventional internal combustion engines in motor vehicles. Not only would fuel costs be minimized, but there would be no necessity for an electric starter, generator, battery, radiator, or even a transmission, since the elimination of gears would ensure smooth, controlled acceleration, although such devices could, of course, be included in the vehicle if desired.

Most important, with the present invention there is no combustion, in contrast to most present power production facilities, with the result that there is no toxic pollution of the air, soil, or water. It is well known that increasing pollution is one of the most eminent and greatest dilemmas facing our nation, as well as other nations of the world, and it is believed that the present invention might well provide the solution to this urgent problem.

It is to be understood, as hereinabove mentioned, that numerous variations in the design and construction of the osmopower unit described herein are possible within the intended scope of the invention and said invention is by no means to be limited or confined to the illustrated embodiments thereof. What is intended to be covered are not only the forms of the invention shown and described in the foregoing specification and drawings, but also any and all modifications or variations thereof as may come within the spirit of said invention.

We claim:

1. A power generating device comprising: a chamber adapted to contain a solvent; a solution container communicating with said solvent chamber and having openings in its surface through which a solvent can pass; a semipermeable material mounted in covering relation to said container surface openings; a restricted fluid pressure area associated with said solution container and having a fluid therein; means for introducing a solution into said solution container, said solution being impermeable relative to said semipermeable material; means for introducing a solvent into said solvent chamber which solvent is of lesser molecular concentration than said solution and which is permeable relative to said semipermeable material, whereby osmosis causes said solvent to flow through said semipermeable material and into said solution container, the resulting increased volume of solution in said container causing pressure to be applied to the fluid in said restricted area; and means for releasing said fluid pressure in the form of usable power.

2. The device recited in claim 1 wherein said pressure area comprises a pressure cell associated with said solution container; wherein a movable element is mounted in said solution container; and wherein compression means operatively associated with said movable element and positioned in said pressure cell is adapted to progressively compress the fluid therein as the volume of solution in said container is progressively increased.

3. The device recited in claim 2 wherein said movable element comprises a piston axially movably mounted in and projecting from said solution container, and wherein said compression means in the pressure cell comprises an enlarged head carried on the projecting end of said piston in axially-movable, substantially leakproof engagement with the wall of said pressure cell.

4. The device recited in claim 1 and including control means for releasing said pressure at a predetermined rate and force.

5. The device recited in claim 1 and including gauge means indicating the pressure in said pressure area.

6. The device recited in claim 1, wherein said semipermeable material is in the form of a membranelike lining on the inner or outer surface of said solution container.

7. The device recited in claim 1, wherein said solution container is formed of two plies and said semipermeable material is sandwiched therebetween.

8. The device recited in claim 6, wherein said semipermeable membrane is pleated to increase the surface area thereof.

9. The device recited in claim 2, and including means for evacuating solution from the container and recirculating the same back to said container for subsequent power production cycles.

10. The device recited in claim 3, and including means for returning said movable piston to its original position after the fluid pressure has been released from said pressure cell.

11. The device recited in claim 1, and including valve means associated with said pressure area adapted to automatically relieve the pressure therein when said pressure exceeds a predetermined level.

12. The device recited in claim 1, and including thermostatically-controlled heating means associated with said unit.

13. The device recited in claim 1, wherein said solvent chamber and solution containers are provided with fluid inlet and drainage valves.

14. The device recited in claim 3, wherein said piston is of telescopic construction.

15. The device recited in claim 1, wherein said solution is an electrolyte solution.

16. The device recited in claim 1, wherein said solution is a nonelectrolyte solution.

17. The device recited in claim 1, wherein said solvent is water.

18. The device recited in claim 1, wherein said solvent is a solution of lesser molecular concentration than the solution in said solution container.

19. The device recited in claim 1, and including a plurality of said pressure areas associated with said solution container.

20. A power generating device, comprising: a solvent supply; a porous solution container positionable in said solvent including a semipermeable material through which the solvent can pass; means for introducing into said container a solution which is impermeable relative to said semipermeable material; means for positioning said solution container in said solvent to cause said solvent to flow by osmosis through said semipermeable material and into said container to increase the volume of solution therein to the point where said container is filled and additional solvent subsequently flowing therein by osmosis causes said solution to be pressurized within said container; and means associated with said container for discharging said pressurized solution in the form of a controlled jet stream for use as a power source.

21. The device recited in claim 20 and including means for collecting and recirculating said discharged solution back to said container.

22. The device recited in claim 20, wherein said solution is of a nontoxic nature, and wherein said solution container can be immersed in a lake or other natural body of water.

23. The device recited in claim 20, wherein said discharge means includes a plurality of selectively operable nozzles of different diameters.

24. The device recited in claim 20, wherein said solution container includes a pair of spaced walls and wherein said semipermeable material is sandwiched therebetween.

25. A power generating device, comprising: and elongated porous solution container having a first end and a second, opposite end; a semipermeable material mounted on said porous container; a first piston axially movably mounted in said container having a disc defining a solution-containing chamber in the first end portion of said container and a piston head normally spaced from the longitudinal midpoint of said container; a second piston axially movably mounted in said container having a disc defining a solution-containing chamber in the second end portion of said container and a piston head normally spaced from the longitudinal midpoint of said container, said opposed piston heads defining a fluid pressure area therebetween; a first solvent chamber surrounding one end of said solution container; a second solvent chamber surrounding the opposite end of said solution container; an osmolarity regulator communicating and operatively associated with said first and second container solution-containing chambers; means for selectively inducing an electric current in said solution-containing chambers to provide electromagnetic fields adapted to create turbulence therein and coacting with said osmolarity regulator to shift the molecular balance between said solution-containing chambers and causing reciprocating movement of said opposed pistons to maintain a predetermined constant pressure within said pressure area therebetween; and jet pressure release means communicating with said pressure area.

26. The device recited in claim 25, and including control means for accurately maintaining the pressure in said pressure area within predetermined limits.